United States Patent
Anwar

(10) Patent No.: US 6,885,931 B2
(45) Date of Patent: Apr. 26, 2005

(54) CONTROL ALGORITHM FOR A YAW STABILITY MANAGEMENT SYSTEM

(75) Inventor: Sohel Anwar, Canton, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 47 days.

(21) Appl. No.: 10/422,538

(22) Filed: Apr. 24, 2003

(65) Prior Publication Data

US 2004/0225427 A1 Nov. 11, 2004

(51) Int. Cl.⁷ .............................. B60T 8/00; G06F 7/00
(52) U.S. Cl. ....................... 701/72; 701/78; 303/146
(58) Field of Search .............................. 701/72, 78, 70, 701/41; 303/146, 140; 700/44

(56) References Cited

U.S. PATENT DOCUMENTS

| | | | |
|---|---|---|---|
| 4,898,431 A | * 2/1990 | Karnopp et al. ............ 303/146 |
| 5,424,942 A | * 6/1995 | Dong et al. .................. 700/44 |
| 5,506,770 A | 4/1996 | Brachert ................ 364/424.01 |
| 5,576,959 A | 11/1996 | Hrovat et al. ............ 364/26.03 |
| 5,671,143 A | 9/1997 | Gräber ................ 364/426.016 |
| 5,694,321 A | 12/1997 | Echert et al. ......... 364/426.037 |
| 5,710,704 A | 1/1998 | Gräber ................ 364/426.027 |
| 5,711,025 A | 1/1998 | Eckert et al. ................. 701/83 |
| 5,774,821 A | 6/1998 | Eckert ......................... 701/78 |
| 5,862,503 A | 1/1999 | Eckert et al. ................. 701/78 |
| 5,869,943 A | 2/1999 | Nakashima et al. ........ 318/586 |
| 5,948,027 A | 9/1999 | Oliver, Jr. et al. ............ 701/37 |
| 6,035,251 A | 3/2000 | Hac et al. ...................... 701/70 |
| 6,056,371 A | * 5/2000 | Lin et al. .................... 303/146 |
| 6,064,930 A | 5/2000 | Shibahata ..................... 701/36 |
| 6,089,680 A | 7/2000 | Yoshioka et al. ........... 303/146 |
| 6,122,584 A | 9/2000 | Lin et al. ...................... 701/70 |
| 6,205,375 B1 | 3/2001 | Naito ............................. 701/1 |
| 6,205,391 B1 | 3/2001 | Ghoneim et al. ............. 701/70 |
| 6,212,460 B1 | 4/2001 | Rizzo et al. ................... 701/70 |
| 6,226,587 B1 | 5/2001 | Tachihata et al. ............. 701/72 |
| 6,272,418 B1 | 8/2001 | Shinmura et al. ............. 701/72 |
| RE37,522 E | 1/2002 | Karnopp et al. ............ 303/146 |
| 6,334,656 B1 | 1/2002 | Furukawa et al. .......... 303/146 |
| 6,371,234 B1 | 4/2002 | Yasuda ........................ 180/197 |
| 6,415,215 B1 | 7/2002 | Nishizaki et al. ............. 701/70 |
| 6,427,102 B1 | 7/2002 | Ding ............................. 701/34 |
| 6,435,626 B1 | 8/2002 | Kostadina ................... 303/139 |
| 6,453,226 B1 | 9/2002 | Hac et al. ...................... 701/48 |
| 6,466,857 B1 | * 10/2002 | Belvo .......................... 701/82 |
| 2002/0052681 A1 | 5/2002 | Matsuno ....................... 701/70 |
| 2002/0095251 A1 | 7/2002 | Oh et al. ....................... 701/70 |
| 2002/0128760 A1 | 9/2002 | Bodie et al. .................. 701/37 |
| 2002/0143451 A1 | 10/2002 | Hac et al. ...................... 701/48 |

OTHER PUBLICATIONS

Kiencke, U. and Nielsen, L., "Automotive Control System for Engine, Driveline, and Vehicle", SAE International, 2000.

Clarke, D. W., Mohtadi, C., Tuffs, P.S., "Generalized Predicitive Cointrol—Part I. The Basic Algorithm", Automatica, vol. 23, No. 2, pp. 137–148, 1987.

* cited by examiner

Primary Examiner—Michael J. Zanelli
(74) Attorney, Agent, or Firm—Brinks Hofer Gilson & Lione

(57) ABSTRACT

A yaw stability control system is based on a linearized vehicle model and a predictive control algorithm. The control algorithm compares the vehicle yaw rate, from, for example, a production grade yaw rate sensor, with a desired yaw rate, which may be computed based on the vehicle speed and the steering wheel angle. If the yaw rate error, defined as the difference between the desired and measured yaw rates, exceeds a certain threshold, a controlling yaw moment is calculated based on the predictive control algorithm. This controlling yaw moment, or yaw torque, command is then translated into one or more actuator commands. For example, the control yaw moment may be produced by braking one or more of the vehicle's wheels.

8 Claims, 3 Drawing Sheets

CONTROL ALGORITHM FOR A YAW STABILITY MANAGEMENT SYSTEM

BACKGROUND

1. Technical Field

The present invention relates generally to yaw stability control systems, and more particularly relates to a control algorithm for such systems.

2. Background Information

Yaw stability control ("YSC") systems have been established in the automotive industry as a safety/performance feature on vehicles. YSC generally prevents the vehicle from under-steering or over-steering in a handling maneuver, for example, during lane changes and salom maneuvers, particularly on low friction surfaces. YSC also helps the driver maintain yaw stability of the vehicle in a high G handling maneuver. The effectiveness of these systems varies widely depending on the system design, road conditions, and driver's response. Most of these systems are based on empirical data and are heavily dependent on experimental testing.

BRIEF SUMMARY

The present invention provides a yaw stability control system based on a linearized vehicle model and a predictive control algorithm. The control algorithm compares the vehicle yaw rate (measured from, for example, a production grade yaw rate sensor) with a desired yaw rate, which may be computed based on the vehicle speed and the steering wheel angle. If the yaw rate error, defined as the difference between the desired and measured yaw rates, exceeds a certain threshold, a controlling yaw moment is calculated based on the predictive control algorithm. This controlling yaw moment, or yaw torque, command is then translated into one or more actuator commands. For example, the control yaw moment may be produced by braking one or more of the vehicle's wheels.

Some implementations of the yaw stability control system may include one or more of the following advantages. The control system significantly improves vehicle yaw stability performance on low friction surfaces. The control algorithm provides an insight into the incipient yaw stability that can be controlled with an appropriate actuation system. This early detection of yaw instability via the predictive algorithm enhances the vehicle yaw stability performance (i.e. response, NVH, etc.), particularly on low friction surfaces. The tracking ability of the control algorithm maintains consistent performance over a wide range of handling conditions, and furthermore, the robustness of the algorithm maintains good performance even in the presence of random external disturbances.

The foregoing discussion has been provided only by way of introduction. Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

The accompanying drawings, incorporated in and forming a part of the specification, illustrate several aspects of the present invention and, together with the description, serve to explain the principles of the invention. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

Figure 1:
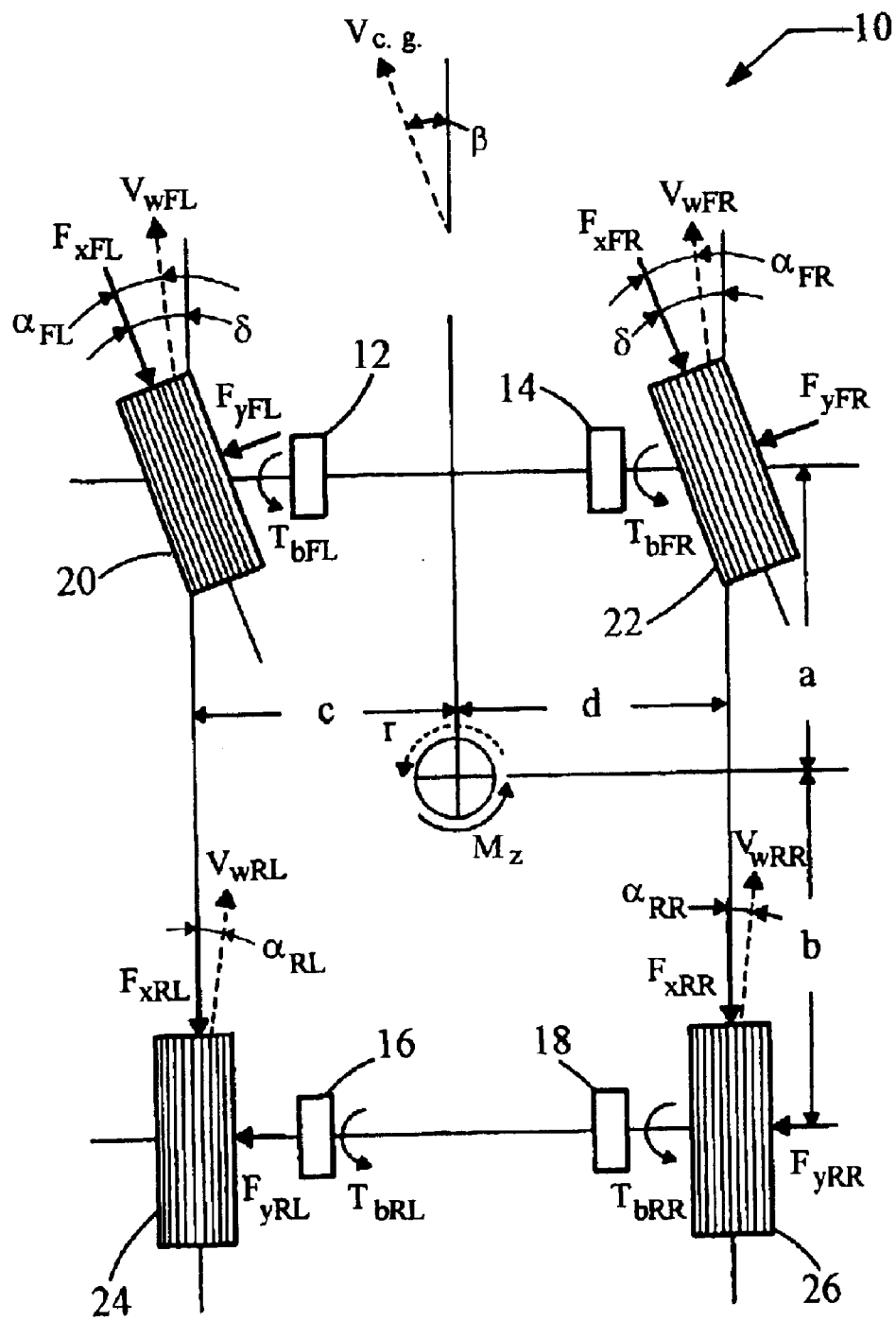
FIG. 1 depicts the forces acting on a vehicle during a handling maneuver.

FIG. 1 illustrates a schematic representation of a vehicle 10 provided with a set of eddy current machines ("EM") 12, 14, 16 and 18 such as, for example, actuators used to activate the vehicle's brakes. Under the direction of a control algorithm of a yaw stability control ("YSC") system, one or more of the eddy current machines 12, 14, 16, and 18 individually impart torque on the corresponding wheels 20, 22, 24, and 26, to maintain the yaw stability of the vehicle 10 during handling maneuvers.

During such maneuvers, the x and y forces acting on the tire patches of the wheels 20, 22, 24, and 26 are $F_{xFL}$ and $F_{yFL}$, $F_{xFR}$ and $F_{yFR}$, $F_{xRL}$ and $F_{yRL}$, and $F_{yRR}$ and $F_{yRR}$, respectively. And the yaw dynamics of the vehicle 10 in these maneuvers is represented by the equation:

$$I_{zz}\frac{dr}{dt} = a(F_{yFL}\cos\delta_1 - F_{xFL}\sin\delta_1 + F_{yFR}\cos\delta_2 - F_{xFR}\sin\delta_2) + \\ b(F_{yRR} + F_{yRL}) + c(F_{yFL}\sin\delta_1 + F_{xFL}\cos\delta_1 + F_{xRL}) - \\ d(F_{yFR}\sin\delta_2 + F_{xFR}\cos\delta_2 + F_{xRR}) + M_z \quad (1)$$

where,
r=vehicle yaw rate,
t=time,
$I_{zz}$=vehicle yaw inertia,
$M_z$=control yaw moment,
$F_{xFL}$, $F_{yFL}$, $F_{xFR}$, $F_{yFR}$, $F_{xRL}$, $F_{yRL}$ $F_{xRR}$, $F_{yRR}$=tire contact patch forces in x- and y-directions as illustrated in FIG. 1,
$\delta_1$, $\delta_2$=road wheel angle for the front wheels, and
a, b, c, d=contact patch locations from the vehicle center of gravity (C.G.).

With the following assumptions:
Road wheel angle for the front left tire is equal to the road wheel angle for the front right tire, and
The force in x-direction is very small in a non-braking situation, equation (1) is rewritten as:

$$I_{zz}\dot{r}=a(F_{yFL}+F_{yFR})\cos\delta+b(F_{yRR}+F_{yRL})+cF_{yFL}\sin\delta+M_z \quad (2)$$

where "( )" represents $$\frac{d(\ )}{dt}$$

of a variable ( ). It is further assumed that the slip angles on the left and right wheels of the vehicle are the same, i.e., the slip angle on the front left contact patch is the same as that on the front right contact patch, etc. Moreover, the lateral friction forces are assumed to vary linearly with the slip angle. Accordingly, $$\alpha_{FL}=\alpha_{FR}=\alpha_F;\ \alpha_{RL}=\alpha_{RR}=\alpha_R\ F_{yFL}=C_{FL}\alpha_F;\ F_{yFR}=C_{FR}\alpha_F;\ F_{yRL}=C_{RL\alpha R};\\ F_{yRR}=C_{RR}\alpha_r \quad (3)$$

where $C_{FL}\alpha$, $C_{FR}$, $C_{RL}$, & $C_{RR}$ are the cornering coefficients from a two track vehicle model, and $\alpha_{FL}$, $\alpha_{FR}$, $\alpha_{RL}$, and $\alpha_{RR}$ are slip angles associated with each wheel.

With the above simplification, the yaw dynamics equation becomes:

$$\dot{r} = \frac{1}{I_{zz}}[a(C_{FL} + C_{FR})\alpha_F \cos\delta + \qquad (4)$$
$$b(C_{RL} + C_{RR})\alpha_R + (c*C_{FL} - d*C_{FR})\alpha_F \sin\delta + M_z]$$

The slip angles, $\alpha$, are related to the body side slip angle, $\beta$, the road wheel angle, $\delta$, and the yaw rate, r, by the following relationships:

$$\alpha_F = \left(\delta - \beta - \frac{r}{V_{cg}}a\right) \qquad (5)$$

$$\alpha_R = \left(-\beta + \frac{r}{V_{cg}}b\right)$$

Substituting the above relationship (5) in equation (4), the following equation is obtained:

$$\dot{r} = \frac{1}{I_{zz}} \begin{bmatrix} a(C_{FL} + C_{FR})\left(\delta - \beta - \frac{r}{V_{cg}}a\right)\cos\delta + \\ b(C_{RL} + C_{RR})\left(-\beta + \frac{r}{V_{cg}}b\right) + \\ (c*C_{FL} - d*C_{FR})\left(\delta - \beta - \frac{r}{V_{cg}}a\right)\sin\delta + M_z \end{bmatrix} \qquad (6)$$

Assuming $C_{FL}=C_{FR}=C_F$ and $C_{RL}=C_{RR}=C_R$, equation (6) simplifies to:

$$\dot{r} = \frac{1}{I_{zz}} \begin{bmatrix} \{2aC_F\cos\delta + (c-d)C_F\sin\delta\}\delta - \\ \{2aC_F\cos\delta + (c-d)C_F\sin\delta\}\frac{a}{V_{cg}} - \frac{2b^2C_R}{V_{cg}}\}r - \\ \{2aC_F\cos\delta + (c-d)C_F\sin\delta + 2bC_R\}\beta + M_z \end{bmatrix} \qquad (7)$$

The side slip state equation then becomes:

$$V_{cg}(\dot{\beta} + r) = \qquad (8)$$
$$\frac{1}{m_{cg}}[(F_{xFL} + F_{xFR})\sin\delta - (F_{yFL} + F_{yFR})\cos\delta - (F_{yRL} + F_{yRR})]\cos\beta +$$
$$\frac{1}{m_{cg}}[(F_{xFL} + F_{xFR})\cos\delta + (F_{yFL} + F_{yFR})\sin\delta + (F_{xRL} + F_{xRR})]\sin\beta$$

Again, assuming that the forces in x-direction in a non-braking situation are very small, the following expression is obtained:

$$\dot{\beta} = -\frac{1}{V_{cg}m_{cg}}[(F_{yFL} + F_{yFR})\cos\delta + (F_{yRL} + F_{yRR})]\cos\beta + \qquad (9)$$
$$\frac{1}{V_{cg}m_{cg}}[(F_{yFL} + F_{yFR})\sin\delta]\sin\beta - r$$

Further, simplifying and substituting the relationship between slip angle and lateral forces provides the following equation:

$$\dot{\beta} = -\frac{1}{V_{cg}m_{cg}}[(C_{FL} + C_{FR})(\cos\beta\cos\delta - \sin\beta\sin\delta)\alpha_F + \qquad (10)$$
$$(C_{RL} + C_{RR})\alpha_R\cos\beta] - r$$

Substituting the slip angle equation yields the expression:

$$\dot{\beta} = -\frac{1}{V_{cg}m_{cg}}\left[(C_{FL} + C_{FR})\left(\delta - \beta - \frac{r}{V_{cg}}a\right)\cos(\beta + \delta) + \qquad (11)\right.$$
$$\left.(C_{RL} + C_{RR})\left(-\beta + \frac{r}{V_{cg}}b\right)\cos\beta\right] - r$$

Since the above equation is nonlinear in $\beta$, it is assumed that variation of $\beta$ is very small about the operating value. With this assumption, the above equation simplifies to:

$$\dot{\beta} = -\frac{1}{V_{cg}m_{cg}}\begin{bmatrix} (C_{FL} + C_{FR})(\delta - \beta)\cos\delta - (C_{RL} + C_{RR})\beta - \\ (C_{FL} + C_{FR})\frac{r}{V_{cg}}a\cos\delta + (C_{RL} + C_{RR})\frac{r}{V_{cg}}b \end{bmatrix} - r \qquad (12)$$

Using the assumption that $C_{FL}=C_{FR}=C_F$ and $C_{RL}=C_{RR}=C_R$, the following equation is obtained:

$$\dot{\beta} = \qquad (13)$$
$$-\frac{1}{V_{cg}m_{cg}}\left[2C_F(\delta - \beta)\cos\delta - 2C_R\beta - 2C_F\frac{r}{V_{cg}}a\cos\delta + 2C_R\frac{r}{V_{cg}}b\right] - r$$

Combining the equations for r and $\beta$ yields the following state equations:

$$\begin{bmatrix}\dot{\beta} \\ \dot{r}\end{bmatrix} = \begin{bmatrix} -\frac{2C_F\cos\delta + 2C_R}{V_{cg}m_{cg}} & -\frac{2aC_F\cos\delta + 2bC_R}{V_{cg}^2 m_{cg}} - 1 \\ -\frac{\{2aC_F\cos\delta + (c-d)C_F\sin\delta - 2bC_R\}}{I_{zz}} & -\frac{\{\{2aC_F\cos\delta + (c-d)C_F\sin\delta\}a - 2b^2C_R\}}{V_{cg}I_{zz}} \end{bmatrix}\begin{bmatrix}\beta \\ r\end{bmatrix} + \begin{bmatrix} \frac{2C_F\cos\delta}{V_{cg}m_{cg}} \\ \frac{2aC_F\cos\delta + (c-d)C_F\sin\delta}{I_{zz}} \end{bmatrix}\delta + \begin{bmatrix}0 \\ \frac{1}{I_{zz}}\end{bmatrix}M_z \qquad (14)$$

for the rate of change of the yaw rate, r, and the yaw angle, $\beta$.

The above equation (14) is linearized about $\delta=0$ such that:

$$\begin{bmatrix}\dot{\beta} \\ \dot{r}\end{bmatrix} = \begin{bmatrix} -\frac{2(C_F + C_R)}{V_{cg}m_{cg}} & -\frac{2(aC_F - bC_R)}{V_{cg}^2 m_{cg}} - 1 \\ -\frac{2(aC_F - 2bC_R)}{I_{zz}} & -\frac{2(a^2C_F - b^2C_R)}{V_{cg}I_{zz}} \end{bmatrix}\begin{bmatrix}\beta \\ r\end{bmatrix} + \begin{bmatrix}0 \\ \frac{1}{I_{zz}}\end{bmatrix}M_z \qquad (15)$$

Therefore the plant dynamics (vehicle yaw dynamics) is represented by the following set of equations:

$$\begin{bmatrix}\dot{x}_1 \\ \dot{x}_2\end{bmatrix} = \begin{bmatrix}a_{11} & a_{12} \\ a_{21} & a_{22}\end{bmatrix}\begin{bmatrix}x_1 \\ x_2\end{bmatrix} + \begin{bmatrix}b_1 \\ b_2\end{bmatrix}u \qquad (16)$$

$$y = \begin{bmatrix}c_1 & c_2\end{bmatrix}\begin{bmatrix}x_1 \\ x_2\end{bmatrix}$$

-continued where $x_1 = \beta$ $x_2 = r$ $a_{11} = -\dfrac{2(C_F + C_R)}{V_{cg} m_{cg}}$ $a_{12} = -\dfrac{2(aC_F - bC_R)}{V_{cg}^2 m_{cg}} - 1$ $a_{21} = -\dfrac{2(aC_F - 2bC_R)}{I_{zz}}$ $a_{22} = -\dfrac{2(a^2 C_F - b^2 C_R)}{V_{cg} I_{zz}}$ $b_1 = 0$ $b_2 = \dfrac{1}{I_{zz}}$ $c_1 = 0$ $c_2 = 1$ where A transfer function representation of the above state-space system is given by the expression:

$$\dfrac{R(s)}{M_z(s)} = \dfrac{\dfrac{a_{11}}{I_{zz}}}{s^2 - (a_{11} + a_{22})s + (a_{11}a_{22} - a_{12}a_{21})} \quad (17)$$

which can be discretized to obtain a discrete time transfer function. Utilizing a bilinear transformation for this purpose, the following transfer function is obtained:

$$\dfrac{R(z)}{M_z(z)} = \dfrac{e(1 + 2z^{-1} + z^{-2})}{d_0 + d_1 z^{-1} + d_2 z^{-2}} \quad (18)$$

where $c_0 = \dfrac{a_{11}}{I_{zz}} T^2$ (19)

$d_0 = T^2(a_{11}a_{22} - a_{12}a_{21}) - 2T(a_{11} + a_{22}) + 4$ $d_1 = 2T^2(a_{11}a_{22} - a_{12}a_{21}) - 8$ $d_2 = T^2(a_{11}a_{22} - a_{12}a_{21}) + 2T(a_{11} + a_{22}) + 4$ where
and T represents the sample time.

Turning now to the predictive control features of the YSC system, the control algorithm uses knowledge of the desired vehicle yaw rate, given the steering angle and vehicle speed. The objective of the controller is to track the desired yaw rate by minimizing the sum of future yaw rate errors that is given by the expression:

$$J = \sum_{j=0}^{N} [r_{des}(t+j) - r(t+j)]^2 \quad (20)$$

where
J=yaw rate performance index for the vehicle,
N=prediction horizon,
$r_{des}(t+j)$=desired yaw rate at time (t+j), and
$r(t+j)$=predicted yaw rate at time (t+j).

Generalized predictive control (GPC) utilizes Diophantine type discrete mathematical identities to obtain predicted plant output in the future. In addition to its predictive capabilities, GPC has been shown to be robust against modeling errors and external disturbances. In the following discussion, a discrete version of the GPC is derived.

First, the transfer function in equation (18) above is rewritten as:

$$(d_0 + d_1 z^{-1} + d_2 z^{-2})R(z) = e(1 + 2z^{-1} + z^{-2})M_z(z) \quad (21)$$

The Diophantine prediction equation (j-step ahead predictor) is given by:

$$E_j(z^{-1})(d_0 + d_1 z^{-1} + d_2 z^{-2})\Delta + z^{-j} F_j(z^{-1}) = 1 \quad (22)$$

where,
$E_j(z^{-1})$=A polynomial in $z^{-1}$ with order (j−1), and
$F_j(z^{-1})$=A polynomial in $z^{-1}$ of degree 1.

Multiplying both sides of equation (22) by r(t+j) and after rearranging, the following expression is obtained:

$$r(t+j) = F_j r(t) + E_j e(1 + 2z^{-1} + z^{-2})\Delta M_z(t+j-1) \quad (23)$$

The objective function is rewritten in matrix format as:

$$J = [R_{Des} - R]^T [R_{Des} - R] \quad (24)$$

where $R_{Des} = [r_{Des}(t+1) r_{Des}(t+2) \ldots r_{Des}(t+N)]$, $R = [R(t+1) R(t+2) \ldots R(t+N)]$, and where $R(t+1) = F_1 r(t) + G_1 \Delta M_z(t)$ (25)
$R(t+2) = F_2 r(t) + G_2 \Delta M_z(t+1)$
$\vdots$
$R(t+N) = F_N r(t) + G_N \Delta M_z(t+N-1)$ where $G_j(z^{-1}) = E_j(z^{-1}) e(1 + 2z^{-1} + z^{-2})$ The predicted yaw rate equations can be re-written in a matrix format as follows:

$$R = G * U + f \quad (26)$$

where $G = \begin{bmatrix} g_0 & 0 & \cdots & 0 \\ g_1 & g_0 & \cdots & 0 \\ \vdots & \vdots & \vdots & \vdots \\ g_{N-1} & g_{N-2} & \cdots & g_0 \end{bmatrix}$ $U = [\Delta M_z(t) \Delta M_z(t+1) \ldots \Delta M_z(t+N-1)]^T$ $f = [f(t+1) f(t+2) \ldots f(t+N)]^T$ $f(t+1) = [G_1(z^{-1}) - g_{10}]\Delta M_z(t) + F_1 r(t)$ $f(t+2) = z[G_2(z^{-1}) - z^{-1} g_{21} - g_{20}]\Delta M_z(t) + F_2 r(t)$ $\vdots$ $G_i(z^{-1}) = g_{i0} + g_{i1} z^{-1} + \ldots$ The objective function is rewritten as follows:

$$J = [R_{Des} - f - GU]^T [R_{Des} - f - GU] \quad (27)$$

Minimization of the objective function yields the following predictive control law:

$$U = [G^T G]^{-1} G^T (R_{Des} - f) \quad (28)$$

where U is a vector. To obtain the control law at the present time, only the first element of U is used. Therefore the control law is given by $$\Delta M_z(t) = \Delta M_z(t-1) + g^T (R_{Des} - f) \quad (29)$$

where $g^T$ is the first row of $[G^T G]^{-1} G^T$.

Accordingly, equation (29) is the predictive yaw control moment equation for the yaw stability control system.

The control moment can be generated via a number of actuation systems. In some implementations, an electromagnetic brake based yaw control system is employed such as the eddy current machines 12, 14, 16, and 18 shown in FIG. 1. The yaw moment M, is generated by selectively energizing these eddy current machines 12, 14, 16 and 18, which are located at the four corners of the vehicle, thereby applying braking torques to the respective wheels.

There are two conditions that are associated with yaw instability: a) an under-steer condition, and b) an over-steer condition. In the under-steer condition the absolute value of the vehicle yaw rate, r, is always smaller than the absolute value of desired vehicle yaw rate, $r_{des}$. On the other hand, in the over-steer condition, the absolute value of the vehicle yaw rate, r, is always larger than the absolute value of desired vehicle yaw rate, $r_{des}$. With this in mind, in the under-steer condition, the control moment $M_z$ is generated by braking the inner wheels, whereas in the over-steer condition the control yaw moment is generated by braking the outer wheels.

The required control yaw moment $M_z$ of course, dictates the amount of braking torque imparted on the wheels. When the vehicle is under-steering or over-steering, one or both wheels on a particular side of the vehicle can be braked to generate the control yaw moment, $M_z$. Although braking torques can be applied to both wheels on a particular side of the vehicle, from a control point of view, only one wheel is typically braked to generate the control moment. It should also be noted that braking the front wheel is usually more effective in an over-steer condition, whereas braking the rear wheel is more effective in an under-steer condition.

Based on the above analysis, the control yaw moment $M_z$ is related to the braking forces illustrated in FIG. 1 as follows:

$$M_z = cF_{xFL} \cos \delta - aF_{xFL} \sin \delta - dF_{xFR} \cos \delta - aF_{xFR} \sin \delta + cF_{xRL} - dF_{XRR} \quad (30)$$

where the braking forces on the tires act perpendicular to the axes of rotation of the tires, and where it is assumed that the counterclockwise direction of the vehicle 10 represented in FIG. 1 is positive.

Figure 2A:
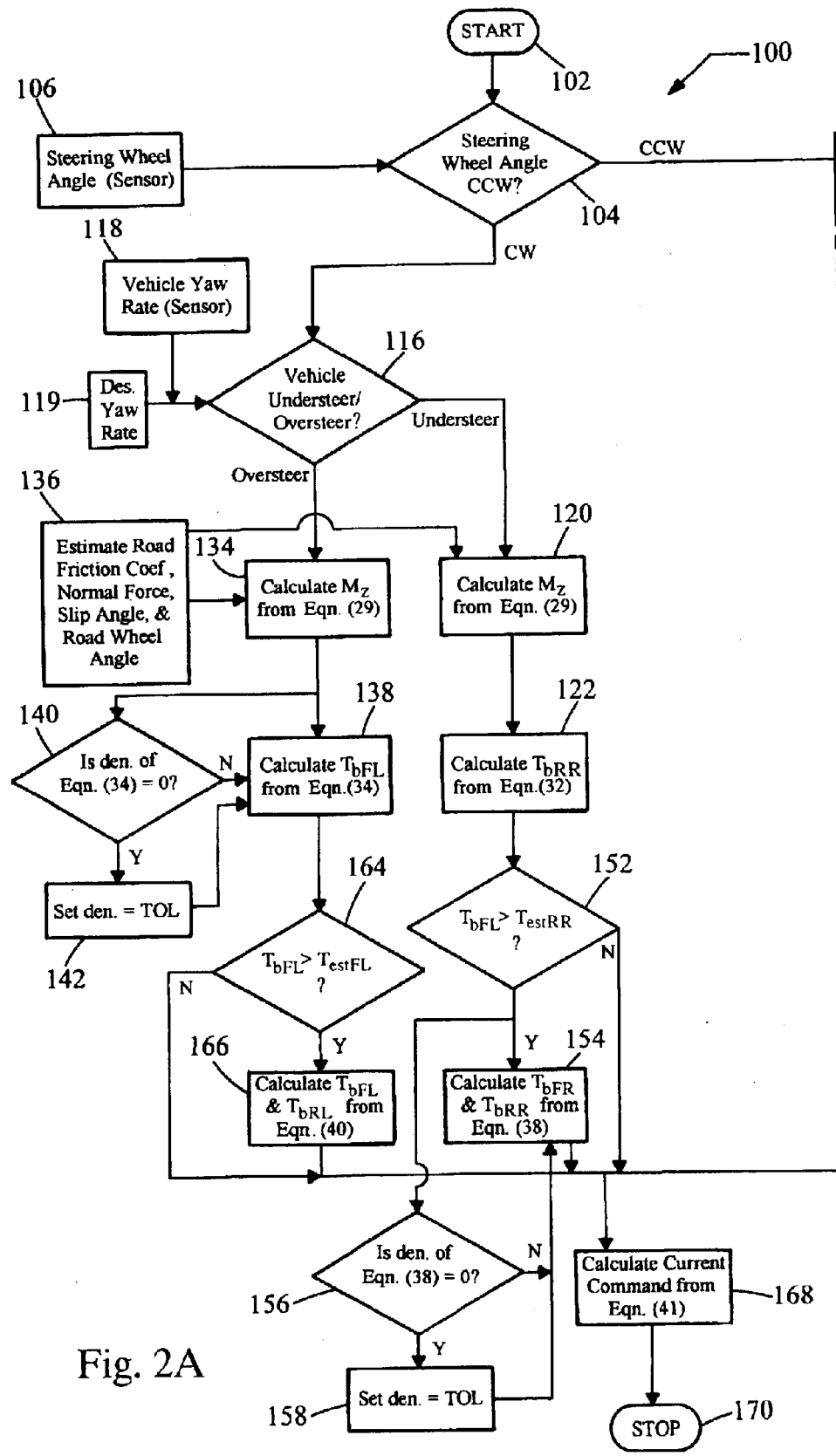
FIG. 2 is a flowchart illustrating a sequence of steps of a control algorithm for maintaining the yaw stability of the vehicle depicted in FIG. 1 in accordance with the invention.
Figure 2B:
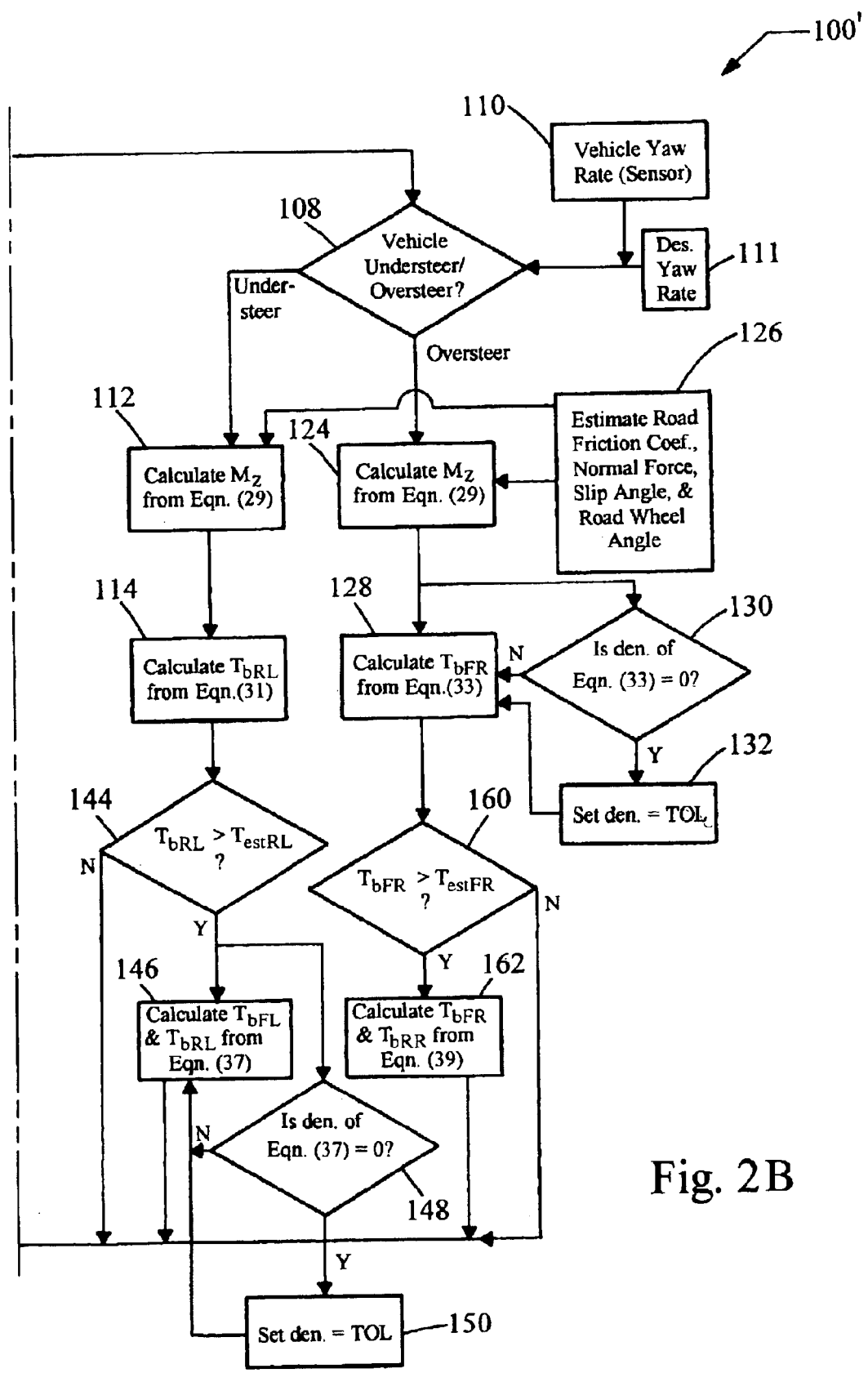

Referring now to FIG. 2, there is shown a process 100 that calculates and produces the desired control yaw torque $M_z$ under various dynamic conditions. From an initial step 102, the process 100 determines in step 104 whether the vehicle is turning clockwise (CW) or counterclockwise (CCW), as indicated by a steering wheel angle sensor provided by block 106.

If the vehicles is turning CCW, then in step 108 the process 100 determines if the vehicle is either in an under-steer or over-steer condition. In addition, block 110 provides the vehicle yaw rate, r, for example, from a sensor, and block 111 provides the desired yaw rate, $r_{des}$. The desired yaw rate can be known beforehand, either from a look-up table based on experimental data or data from previous driving maneuvers.

If the vehicle is in an under-steer condition turning left, the process 100 calculates in step 112 the control yaw torque $M_z$ from equation 29 and receives information from block 126 related to the estimated road friction coefficients, normal force, slip angle, and road wheel angle. The process 100 then calculates the control torque $T_{bRL}$ from the relationship:

$$M_z = cF_{xRL} = c\frac{T_{bRL}}{R} \quad (31)$$

$$T_{bRL} = \frac{R}{c} M_z$$

that is needed to brake the rear left wheel to produce the necessary control yaw torque $M_z$ as indicated by step 114.

If the vehicle is turning clockwise, the process 100 determines in step 116 if the vehicle is under-steering or over-steering, while blocks 118 and 119 provide vehicle yaw rate r and desired yaw rate $r_{des}$ information, respectively, to the control process.

When the vehicle is under-steering in the clockwise (CW) direction, the process 100 calculates the control yaw torque $M_z$ from equation 29 in step 120 and receives information related to the estimated road friction coefficients, normal force, slip angle, and road wheel angle as identified in block 136. The process 100 then calculates in step 122 the control torque, $T_{bRR}$, applied to the rear right wheel needed to produce the control yaw torque, $M_z$, from the relationship:

$$M_z = dF_{xRR} = d\frac{T_{bRR}}{R} \quad (32)$$

$$T_{bRR} = \frac{R}{d} M_z$$

When the vehicle over-steers when turing CCW, the process 100 calculates control yaw torque $M_z$ in step 124 and receives the input data identified in block 126. Next, in step 128, the process 100 calculates the control torque $T_{bFR}$ to be applied to the front right wheel from the expression:

$$M_z = (d \cos \delta - a \sin \delta) F_{xFR} = (d \cos \delta - a \sin \delta) \frac{T_{bFR}}{R} \quad (33)$$

$$T_{bFR} = \frac{R}{(d \cos \delta - a \sin \delta)} M_z$$

to produce the desired control yaw moment, $M_z$. Note that if the denominator of equation 33 is zero, the process sets the denominator to a tolerance (TOL), as indicated by the sequence of steps 130 and 132. The TOL is a very small positive number which is used to prevent any overflow problems in the control algorithm. The TOL may be between about 0.001 and 0.1. Note, however, the TOL does not have to be in this range. Rather, this parameter can be adjusted to any value depending on the resolution requirements for a particular application If the vehicle over-steers in the CW direction, the process 100 calculates control yaw torque $M_z$ in step 134 and receives input data from block 136. Next, in step 138, the process calculates the control torque $T_{bFL}$ that is to be applied to the front left wheel needed to produce $M_z$ from the expression:

$$M_z = (c \cos \delta - a \sin \delta) F_{xFL} = (c \cos \delta - a \sin \delta) \frac{T_{bFL}}{R} \quad (34)$$

$$T_{bFL} = \frac{R}{(c \cos \delta - a \sin \delta)} M_z$$

If the denominator of equation 34 is zero, then in steps 140 and 142 the process 100 sets the denominator to TOL.

Since the torque on the electromagnetic brakes is a function of the rotor speed of the respective brakes, in certain situations the actuators for these brakes may saturate. In case of such saturation, braking of one wheel may not be able to deliver the requested yaw moment. In this situation, both front and rear wheel brakes can be used to generate the requested yaw moment.

To determine if a particular brake actuator is saturated, a torque estimation algorithm for the brake is utilized. A torque estimation algorithm for an eddy current machine, such as the brakes discussed here, given the rotor speed and excitation current is represented by the expression:

$$T_{est} = f_0(\omega) + f_1(\omega) * i + f_2(\omega) * i^2 \qquad (35)$$

where
T=retarding torque,
i=retarder feedback current, $$f_1(\omega) = a_{i0} + a_{i1}\omega + a_{i2}\omega^2 \qquad (36)$$

in which $a_{i0}$, $a_{i1}$, $a_{i2}$=identified parameters, and w=rotor speed.

Thus, if the estimated torque, $T_{est}$, for a particular wheel, as determined in steps 144, 152, 160, and 164 in the process 100, is less than the requested torque as calculated in equations (31) through (34), then the actuator of the brake on the other wheel on the same side of the vehicle is energized as well, with the amount of energization of the actuator depending on the requested torque.

Thus, when the vehicle is in an under-steer condition as it turns CCW, the control moment $M_z$ produced by braking both the front and rear left wheels (i.e. applying the control torques $T_{bFL}$ and $T_{bRL}$) in step 146 is determined from the expressions:

$$M_z = (c\cos\delta - a\sin\delta)F_{xFL} + cF_{RL} \qquad (37)$$

$$= (c\cos\delta - a\sin\delta)\frac{T_{bFL}}{R} + c\frac{T_{bRL}}{R}$$

If $T_{bRL} > T_{estRL}$, then $T_{bRL} = T_{estRL}$ $$T_{bFL} = \frac{RM_z - cT_{estRL}}{(c\cos\delta - a\sin\delta)}$$

If the denominator in equation 37 is zero, then steps 148 and 150 sets the denominator to TOL.

When the vehicle is turning CW in an under-steer condition, the process 100 calculates in step 154 the control torques $T_{bFR}$ and $T_{bRR}$ that are necessary to produce the requested control moment $M_z$, as shown by the expressions:

$$M_z = -(d\cos\delta + a\sin\delta)F_{xFR} - dF_{RR} \qquad (38)$$

$$= -(d\cos\delta + a\sin\delta)\frac{T_{bFR}}{R} - d\frac{T_{bRR}}{R}$$

If $T_{bRR} > T_{estRR}$, then $T_{bRR} = T_{estRR}$ $$T_{bFR} = \frac{RM_z + dT_{estRR}}{(d\cos\delta + a\sin\delta)}$$

In this situation, if the process determines in step 156 that the denominator in equation 38 is zero, then in step 158, the denominator is set to TOL.

When the vehicle is turning CCW in an over-steer condition, the process 100 in step 162 calculates the torques $T_{bFR}$ and $T_{bRR}$ to be applied to the front and rear right wheels required to produce $M_z$ according to the expressions:

$$M_z = -(d\cos\delta + a\sin\delta)F_{xFR} - dF_{RR} \qquad (39)$$

$$= -(d\cos\delta + a\sin\delta)\frac{T_{bFR}}{R} - d\frac{T_{bRR}}{R}$$

If $T_{bFR} > T_{estFR}$, then $T_{bFR} = T_{estFR}$ $$T_{bRR} = \frac{RM_z + (d\cos\delta + a\sin\delta)T_{estFR}}{d}$$

If the vehicle over-steers while turning CW, the process 100 calculates in step 166 the required torques $T_{bFL}$ and $T_{bRL}$ for the front and rear left wheels from the expressions:

$$M_z = (c\cos\delta - a\sin\delta)F_{xFL} + cF_{RL} \qquad (40)$$

$$= (c\cos\delta - a\sin\delta)\frac{T_{bFL}}{R} + c\frac{T_{bRL}}{R}$$

If $T_{bFL} > T_{estFL}$, then $T_{bFL} = T_{estFL}$ $$T_{bRL} = \frac{RM_z - (c\cos\delta - a\sin\delta)T_{estFL}}{c}$$

that are needed to produce the necessary control yaw moment $M_z$.

Once the torque command has been calculated for each brake based on the above equations, the current command to the respective eddy current machine for each brake, is generated in step 168 for a given wheel speed (assuming that actuator is not saturated) according to the expression:

$$I_{XY} = \frac{(T_{bXY} - f_0^{xy}(\omega))}{f_1^{xy}(\omega)} \qquad (41)$$

where
$I_{XY}$=current command to the FL, FR, RL, or RR eddy current machine of the respective brakes,
$T_{bXY}$=desired torque for the FL, FR, RL, or RR eddy current machine, and
$f_0^{xy}$, $f_1^{xy}$=speed dependent retarder parameters The process 100 terminates in step 170 or repeats again in step 102.

It is therefore intended that the foregoing detailed description be regarded as illustrative rather than limiting, and that it be understood that it is the following claims, including all equivalents, that are intended to define the spirit and scope of this invention.

What is claimed is:

1. A method for controlling the yaw stability of a vehicle, comprising:
   measuring a yaw rate of the vehicle with a sensor;
   calculating a desired yaw rate based on the vehicle's speed and steering wheel angle;
   calculating a yaw rate error as the difference between the desired yaw rate and the measured yaw rate;
   comparing the yaw rate error to a threshold;
   measuring a body slip angle;
   calculating state equations for the rate of change of the vehicle yaw rate and the rate of exchange of the body slip angle;
   linearizing the state equations and implementing the linearized state equations in a predictive control algorithm; and
   if the yaw rate error exceeds the threshold, calculating a controlling yaw moment based on the predictive control algorithm.

2. The method of claim 1, wherein the control algorithm tracks a desired yaw rate by minimizing the sum of future yaw rate errors according to the expression $$\Delta M_z(t) = \Delta M_z(t-1) + g^T(R_{Des} - f)$$

where $M_z$ is the control yaw moment, $g^T$ is the first row of $[G^T G]^{-1} G^T$, t is time, $R_{Des}$ is the component of an objective function of the desired yaw rate, and f is a vector of terms predicting vehicle yaw dynamics in the future.

3. The method of claim 2, wherein a transfer function of the state equations is discretized to obtain a discrete time transfer function.

4. The method of claim 3, wherein the predictive control algorithm utilizes Diophantine type discrete mathematical identities.

5. The method of claim 1, further comprising applying a control yaw moment by braking a rear wheel on a inner side of the vehicle when the vehicle is in an under-steer condition as it turns.

6. The method of claim 5, wherein the applying a control yaw moment includes braking both the front and rear wheels on the inner side of the vehicle.

7. The method of claim 1, further comprising applying a control yaw moment by braking a front wheel on the outer side of the vehicle when the vehicle is in an over-steer condition as it turns.

8. The method of claim 7, wherein the applying a control yaw moment includes braking both front and rear wheels on the outer side of the vehicle.

* * * * *